United States Patent [19]

Skordou et al.

[11] Patent Number: 5,293,589

[45] Date of Patent: Mar. 8, 1994

[54] CIRCUIT WITH PREDETERMINED DELAY FOR SELECTIVELY RELAYING INTERRUPT SIGNALS THROUGH A DAISY-CHAIN OF LINKED MODULES UPON REMOVAL OF A MODULE FROM A SLOT

[75] Inventors: Evangelos Skordou, Langenpreising; Stefan Hofmann, Gauting, both of Fed. Rep. of Germany

[73] Assignee: Force Computers GmbH, Fed. Rep. of Germany

[21] Appl. No.: 472,503

[22] Filed: Jan. 30, 1990

[30] Foreign Application Priority Data

Apr. 19, 1989 [DE] Fed. Rep. of Germany ....... 8904936

[51] Int. Cl.$^5$ ............................................. G06F 13/37
[52] U.S. Cl. ..................... 395/325; 364/229.3; 364/230.2; 364/229.4; 364/DIG. 1; 364/268; 364/268.9; 371/11.2; 371/11.1
[58] Field of Search ................. 364/DIG. 1, DIG. 2; 395/325, 575, 725; 371/11.1, 11.2

[56] References Cited

U.S. PATENT DOCUMENTS

| | | |
|---|---|---|
| 4,271,464 | 6/1981 | MacMillan . |
| 4,363,094 | 12/1982 | Kaul et al. ........................ 395/325 |
| 4,562,535 | 12/1985 | Vincent et al. ..................... 395/325 |
| 4,604,689 | 8/1986 | Burger ............................... 395/325 |
| 4,630,193 | 12/1986 | Kris ................................... 395/325 |
| 4,633,392 | 12/1986 | Vincent et al. ..................... 395/325 |
| 4,799,148 | 1/1989 | Nishioka . |
| 4,914,625 | 4/1990 | Billian .............................. 395/775 |
| 5,083,259 | 1/1992 | Maresh et al. ..................... 395/325 |
| 5,117,494 | 5/1992 | Costes et al. ....................... 395/575 |

FOREIGN PATENT DOCUMENTS

0167827 1/1986 European Pat. Off. .

OTHER PUBLICATIONS

*The VMEbus Handbook*, published by VMEbus Internatinal Trade Association of Scottsdale, Ariz., pp. 78-83 (1989).
R. E. Russell et al.: "Interrupt request circuit" in: IBM Technical Disclosure Bulletin, vol. 27, No. 1B, Jun. 1984; pp. 554-556.

*Primary Examiner*—Thomas C. Lee
*Assistant Examiner*—Larry J. Ellcessor
*Attorney, Agent, or Firm*—Townsend and Townsend Khourie and Crew

[57] ABSTRACT

A computer having a plurality of plug-in modules is provided with a holding circuit for transmitting an interrupt signal over an interrupt signal line. The holding circuit conducts the interrupt signal in the appropriate manner regardless of whether or not a given module is plugged in. At the same time it ensures that a plugged-in module responds to the interrupt signal in the appropriate manner.

11 Claims, 1 Drawing Sheet

CIRCUIT WITH PREDETERMINED DELAY FOR SELECTIVELY RELAYING INTERRUPT SIGNALS THROUGH A DAISY-CHAIN OF LINKED MODULES UPON REMOVAL OF A MODULE FROM A SLOT

BACKGROUND OF THE INVENTION

The invention relates to computers with a plurality of plug-in modules which can transmit or interrupt the transmission of interrupt signals from one module to the next.

Known computers of this type conduct an interrupt signal over a bus which is galvanically connected to each of a plurality of modules. Interrupt signals are sent over the bus and each module detects whether or not the signal is intended for it. To accomplish this each module has a decoding circuit which allows that module to ascertain whether the corresponding interrupt signal is intended for it and, upon receipt of the signal, to perform the appropriate operation.

To enable each of the remaining modules to process interrupt signals specifically intended for it, each module must relay signals not intended for it as rapidly as possible. This is best done within an especially narrow time frame when real-time processing is desired, because a worst-case-analysis must then be performed. In the most extreme case the interrupt signal must be conducted through every module, which for example, could involve addressing as many as 20 plug-in modules.

On the other hand, it is known to direct an interrupt signal simultaneously to all modules so that the intended module can accept the interrupt signal and generate an appropriate acknowledgement. It is, however, frequently desired to prioritize the signal on the basis of location. In such a case it is no longer possible to simultaneously direct the signal to all galvanically coupled modules.

A special problem arises when the modules are frequently changed to make use of the plug-in feature for adapting computers to desired system configurations. Such frequent module changes, though common in conjunction with computers that operate independently of their plug-in location, are not generally used with computers that employ plug-in locations having different addresses and capable of location prioritization. For remote modules, steps would be required to avoid an interference with the interrupt processing.

In many cases these would be complicated and nullify the advantages attained with the plug-in feature of the modules. Conceivable alternatives might be to short circuit the corresponding interrupt signal intended for a module that is missing, by employing a solder bridge, a jumper or a micro-switch that is responsive to the presence or absence of a given module, or the like. Even these alternatives are difficult to operate, are often forgotten and necessitate structural changes at considerable costs, as, for example, from additional protective shielding that may be required.

SUMMARY OF THE INVENTION

Thus, an object of the present invention is to provide a computer having a plurality of plug-in modules which retains the advantageous plug-in feature of standard boards, even when controlling interrupt signals, and especially prioritized interrupt signals without the need for special adapters.

Generally speaking this object of the present invention is achieved with a computer having a plurality of plug-in modules connecting the modules to one another. Each module connected to the bus processes an interrupt signal or an acknowledging signal and it either accepts it as intended for itself within a predetermined response time and prevents further transmission of the signal, or it relays the signal to the next module if it is intended for another module. Each module relays an interrupt signal past a give module if an acknowledging or signal is intended for another module, while the further transmission of the signal is intended for processing by the module under consideration within a predetermined response time. A holding circuit is connected to the interrupt signal line and activated when the associated module is disconnected. The holding circuit includes means for forwarding the interrupt signal over the line with lag time which is considerably less than the predetermined response time. By advantageously employing simple and economic means the interrupt signal can be processed regardless of whether a module not intended to receive the signal is plugged in or not. This also applies to a plugged-in module that receives the interrupt signal prior to the module which is being addressed, i.e. which receives a signal not intended for it. Thus, a master-slave relationship is maintained in the desired manner.

It is necessary to ensure, of course, that an interrupt is not generated for a non-existing module. Should this nevertheless occur, a time-out check must be executed to ascertain the continuation of the signal processing. In all other respects the interrupt signal is transparently processed during which it is especially advantageous for the holding circuit of the present invention to simulate the missing module and for the lag time generated by the holding circuit to remain within the desired time frame.

A lag or transit time of 8 nanoseconds, for example, may be selected for a HCT technology gate. In a worst-case- situation involving 20 plug-in modules this would yield a total running time of $20 \times 8$ ns, or 160 ns.

Thus, with the simulation of the present invention the lag time remains both within the scope of and, in fact, considerably below the response time.

Further the holding circuit is preferably of an open design. For example, an open-collector output can be used which enables an interrupt output signal to be directed to the addressed module without having two logic circuit outputs which operate against each other. By employing a pull-down resistor at the gate input of the holding circuit responsible for relaying an interrupt signal, it is possible to relay the interrupt signal in the case of a missing module and negative logic state (logic "zero" corresponds to the active state) to ensure that the interrupt signal will be forwarded when a module is not pluqged in. It is best to use a simple OR-gate for such an active-low logic and, for example, combining four holding circuits for four corresponding modules are incorporated in one integrated circuit.

The output interrupt signal of one module functions, therefore, as an input signal for the next following module.

The interrupt signal may be either a request for access to the needed component of the computer or a corresponding acknowledgement or confirmation signal. If a module connected to the bus and monitoring interrupt signals requires access to a part of the computer identified by a particular interrupt or acknowledging signal, then the module intercepts and blocks further propagation of the particular interrupt/acknowledging signal. For this purpose the module is provided with a conventional decoding circuit. In general, standard commercially available modules are adequate for use in conjunction with a standardized bus system, since, for example, modules in the form of boards need not be structurally modified in any way.

Moreover, the modules can be changed in a matter of seconds by virtue of the automated daisy-chain circuitry provided by the present invention.

Additional features and advantages are disclosed in the following detailed description of a preferred configuration with reference to the single drawing.

DETAILED DESCRIPTION OF THE PREFERRED EMBODIMENT

Figure 1:
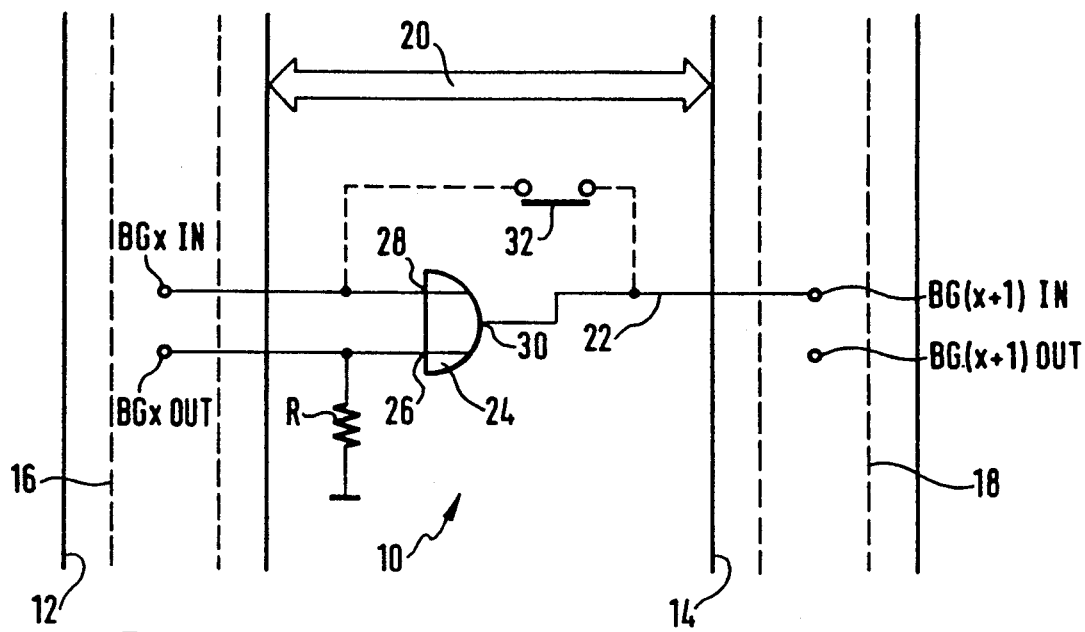
FIG. 1 is an illustration of a holding circuit constructed in accordance with the present invention.
Figure 2:
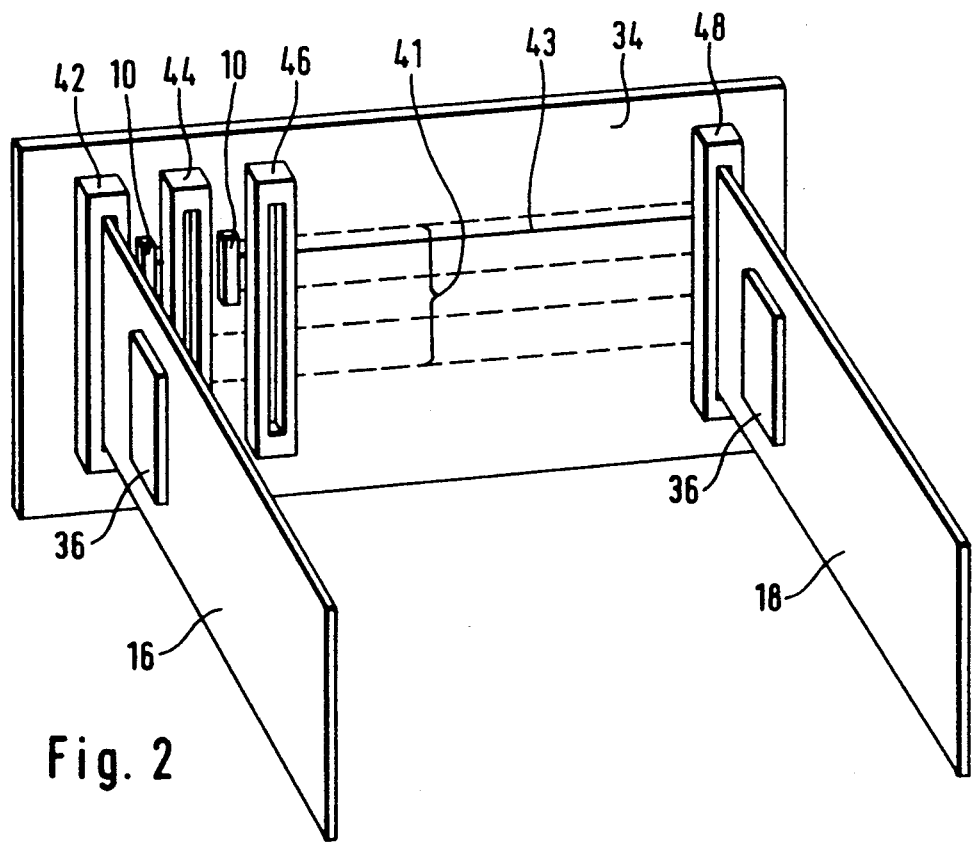
FIG. 2 is a perspective view which illustrates a motherboard and plug-in modules insertable therein.

FIG. 2 shows a portion of a computer motherboard 34 (FIG. 2) into which modules 16, 18 are plugged and a bus 41 connecting the connectors 42, 44, 46, 48 for modules to one another. Each module 16, 18 connected to the bus 41 processes an interrupt signal or an acknowledging signal and it either accepts it as intended for itself within a predetermined response time and prevents further transmission of the signal, or it relays the signal to the next module if it is intended for another module. A holding circuit 10 associated with each connector 42, 44, 46, 48 is connected to an interrupt/acknowledging signal line 43 and activated when a module is disconnected from the associated connector. The holding circuit 10 includes means for forwarding the interrupt/acknowledging signal, illustrated hereinafter with FIG. 1, with a lag time which is considerably less than the predetermined response time.

By advantageously employing simple and economic means the interrupt/acknowledging signal can be processed regardless of whether a module not intended to receive the signal is plugged in or not. This also applies to a plugged-in module that receives the interrupt/acknowledging signal prior to the module which is being addressed, i.e. which receives a signal not intended for it. Thus, a master-slave relationship is maintained in the desired manner.

It is necessary to ensure, of course, that an interrupt is not generated for a non-existing module. Should this nevertheless occur, a time-out check must be executed to ascertain the continuation of the signal processing. In all other respects the interrupt/acknowledging signal is transparently processed during which it is especially advantageous for the holding circuit 10 of the present invention to simulate the missing module and for the lag time generated by the holding circuit 10 to remain within the desired time frame.

A lag or transit time of 8 nanoseconds, for example, may be selected for a HCT technology gate. In a worse-case-situation involving 20 plug-in modules this would yield a total running time of 20×8 ns, or 160 ns.

Thus, with the simulation of the present invention the lag time remains both within the scope of and, in fact, considerably below the response time.

Further the holding circuit 10 is preferably of an open design. For example, an open-collector output (FIG. 1) can be used which enables an interrupt output signal to be directed to the addressed module without having two logic circuit outputs which operate against each other. By employing a pull-down resistor at the gate input of the holding circuit 10 responsible for relaying an interrupt signal, it is possible to relay the interrupt signal in the case of a disconnected module and negative logic state (logic "zero" corresponds to the active state) to ensure that the interrupt signal will be forwarded when a module is not plugged in. It is best to use a simple OR-gate for such an active-low logic and, for example, combining four holding circuits for four corresponding modules in one integrated circuit.

The output interrupt/acknowledging signal of one module functions, therefore, as an input signal for the next module.

The interrupt signal may be either a request for access to the needed component of the computer or a corresponding acknowledgement or confirmation signal. If a module connected to the bus and monitoring interrupt signals requires access to a part of the computer identified by a particular interrupt or acknowledging signal, then the module intercepts and blocks further propagation of the particular interrupt signal. For this purpose the module 10 is provided with a conventional decoding circuit 36. In general, standard commercially available modules are adequate for use in conjunction with a standardized bus system, since, for example, modules in the form of boards need not be structurally modified in any way.

Moreover, the modules can be changed in a matter of seconds by virtue of the automated daisy-chain circuitry provided by the present invention.

FIG. 1 shows a holding circuit 10 located between two plug-in locations 12 and 14 for modules 16 and 18 indicated by dashed lines. Extending between locations 12 and 14 and additional plug-in points, not illustrated in FIG. 1, is a bus 20, which among others has an interrupt signal line 22. In order for the interrupt signal in line 22 to pass from module 16 to module 18 it is directed to holding circuit 10.

Module 16 has two terminals or connectors BGxIN and BGxOUT. Connector BGxIN is also connected to the interrupt signal line of the preceding module (not illustrated). Similarly, interrupt signal line 22 is connected to the input BG(x+1)IN of the following module 18 which, like module 16, also has a second connector BG(x+1)OUT.

Connector BGxOUT or BG(x+1)OUT functions as an output connector for the corresponding module 16 and 18, so that an interrupt signal generated by either module 16 or 18 switches each of the addressed terminals to the logic state "zero". As a result of the use of a negative or active-low-logic the output signal functions with the logic state "zero" as an activating signal.

Holding control circuit 10 has an OR-gate 24 and a resistor R. Resistor R is connected to both connector BGxOUT and input terminal 26 of OR-gate 24 and it functions as a pull-down resistor. Accordingly, the other side of the resistor is grounded.

A second input terminal 28 of OR-gate 24 is coupled to connector BGxIN. By means of this connection an interrupt signal generated by the respective, preceding module 16 is directed to the following holding circuit 10.

OR-gate 24 also has an output terminal 30 which is connected to interrupt signal line 22. With the applied logic, the state of output terminal 30 is "zero", that is active, only when the logic state is "zero" at both input terminals 26 and 28 of OR-gate 24. In other words, when the logic state at connector BGxIN is "zero", the holding circuit 10 applies the logic state of connector BGxOUT to interrupt signal line 22 and thereby applies an interrupt signal to input BG(x+1) with a delay or lag time corresponding to the signal transit time for OR-gate 24.

In the illustrated embodiment an access control-confirmation signal (bus grant) is used as the interrupt signal. If, in accordance therewith, the incoming signal at connector BGxIN on module 16 is at logic "0" and the module 16 has not initiated the interrupt signal, then BGxOUT is set to "0". In such case the logic state is "0" at both input terminals 26 and 28 of OR-gate 24, resulting in a logic state "0" at output terminal 30. If, however, module 16 has generated the interrupt signal, the logic state at output connector BGxOUT is set to "1". This means that the logic state applied to the interrupt signal line 22 remains "1".

This enables module 16 in the desired manner to detect an interrupt signal that is intended for it. The output signal BGxOUT is then switched to a logic state of "one", against pull-down resistor R, so that the logic state of "one" is again applied to interrupt signal line 22.

This shows that when module 16 is not plugged in at plug-in location 12, pull-down resistor R will invariably apply a logic state of "zero" to the input terminal 26. Hence it is impossible for a missing module 16 to have generated the interrupt signal, or to have detected one as being intended for it. It further demonstrates that the signal at connector BG(x+1)IN always corresponds to the signal at connector BGxIN, with the result that the interrupt signal is merely relayed along interrupt signal line 22.

As indicated above it is also possible to employ an open-collector output for OR-gate 24. In such a case, the interrupt signal is conducted over interrupt signal line 22 whenever module 16 is plugged in; when module 16 is removed the signal is conducted via holding circuit 10.

Thus, the interrupt signal passes through OR-gate 24 within the desired time frame, regardless of whether module 16 is plugged in or not.

It is further advantageous to use CMOS technology for the OR-gates so that connectors BGxIN and BGxOUT are subject to only small loads. In addition, it is possible to use a positive or active-high logic instead of the negative, active low logic described above, in which event the gates must be appropriately adapted.

In a second preferred configuration of the present invention, illustrated in FIG. 1 by dashed lines, input terminal 28 is selectively connected to output terminal 30 of OR-gate 24 by way of a plug-in bridge 32. This makes it possible to connect interrupt signal line 22 to connector BGxIN at all times, regardless of whether module 16 is plugged in or not. This presupposes that the integrated circuit which includes OR-gate 24 has first been disconnected.

What is claimed is:

1. A computer comprising a plurality of disconnectable plug-in modules, including a first module, subsequent modules including a second module and preceding modules including a third module, at plug-in locations of the computer, a bus connecting the modules to one another, the bus including a daisy-chained acknowledging signal line for carrying an acknowledging signal between the modules, means associated with each of said modules for and operatively associated with a single one of said modules for relaying said signal past its associated module if the signal is intended for said subsequent modules, a decoding circuit on each one of said modules for preventing a further relaying of the signal by the first module if the signal is intended for the first module, the means for relaying and the decoding circuit of the first module processing the acknowledging signal within a predetermined response time, a holding circuit associated with a corresponding one of said modules at the plug-in location for said corresponding module, said holding circuit having an input connected said acknowledging signal line and activated in response to a disconnection of the corresponding module from its plug-in location; and means in the holding circuit for forwarding the acknowledging signal along the acknowledging signal line when a delay forming an individual lag time for the corresponding module, a sum of said individual lag times for said modules at all said plug-in locations being a total lag time, said total lag time being less than the predetermined response time.

2. A computer according to claim 1, wherein each said holding circuit includes a gate characterized by said individual lag time associated with said holding circuit and wherein the predetermined response time is less than a cycle time for the bus.

3. A computer according to claim 1, including a motherboard constructed so that each of said modules can be plugged into and disconnected from said motherboard, and wherein the holding circuit includes a gate mounted to the motherboard for forwarding the acknowledging signal.

4. A computer according to claim 1, wherein said acknowledging signal has an active state and an inactive state, and wherein the holding circuit comprises a gate having an input and an output and a resistor coupled between input of the gate and output of the gate for switching the output of the gate to a logic state that corresponds to the inactive state of said signal when said first module is disconnected.

5. A computer according to claim 4, wherein each said holding circuit includes means operatively coupled with the input for preventing a transmission of said acknowledging signal to any one of said plugged-in modules connected on said bus downstream of the holding circuit, said resistor being a pull-down resistor for said gate in the absence of any plugged-in module associated with the gate by way of said plug-in locations, and said holding circuit being operative in connection with the associated module to route acknowledging signals to bypass said resistor connected between the gate input and the gate output whenever the module associated is plugged into the bus at the plug-in location associated with the holding circuit rendering it possible for the holding circuit to selectively prevent further relaying of the acknowledging signal.

6. A computer according to claim 1, wherein said first module has a module output connected to said holding circuit and wherein said holding circuit includes an open-collector output for preventing a relaying of said acknowledging signal by the module output to the subsequent modules when the first module is plugged in and has been activated for acknowledging said acknowledging signal.

7. A computer according to claim 6, wherein the third preceding module generates an acknowledging output, wherein one of the holding circuit input and the open-collector output of the holding circuit is connected to receive the acknowledging output of said third preceding module for relaying said acknowledging output to at least said second subsequent module.

8. A computer according to claim 1, wherein said plurality of modules are electrically connected to one another in series, with one holding circuit associated with a plug-in location on the bus for each one of said plurality of modules and each said module so connected being operatively connected to one of said holding circuits.

9. A computer according to claim 1, wherein the acknowledging signal is a bus allocation signal for said first module.

10. A computer according to claim 1, wherein said computer further comprises a plurality of components, and wherein the acknowledging signal is further operative to confirm dedication of one of said components to said first module, and including means for preventing a forwarding of the acknowledging signal from said first module to the second module when said first module has requested and acknowledged the dedication.

11. A computer according to claim 10, wherein the one of said components comprises at least a portion of the bus.

* * * * *